(12) United States Patent
Monnes et al.

(10) Patent No.: US 8,761,786 B2
(45) Date of Patent: Jun. 24, 2014

(54) SYSTEM AND METHOD FOR ASSIGNING COMMUNICATION CELLS TO SERVERS IN A CELLULAR COMMUNICATION SYSTEM

(75) Inventors: Peter Monnes, Chelmsford, MA (US); Thomas A. Hengeveld, Hollis, NH (US)

(73) Assignee: Pine Valley Investments, Inc., Las Vegas, NV (US)

( * ) Notice: Subject to any disclaimer, the term of this patent is extended or adjusted under 35 U.S.C. 154(b) by 466 days.

(21) Appl. No.: 12/431,587

(22) Filed: Apr. 28, 2009

(65) Prior Publication Data

US 2009/0275341 A1 Nov. 5, 2009

Related U.S. Application Data

(60) Provisional application No. 61/050,100, filed on May 2, 2008.

(51) Int. Cl.
*H04W 72/00* (2009.01)
*H04L 1/00* (2006.01)

(52) U.S. Cl.
USPC .................. 455/452.1; 455/450; 370/229

(58) Field of Classification Search
USPC .............. 455/452.1, 449–453, 445; 370/229, 370/312; 375/225; 711/122
See application file for complete search history.

(56) References Cited

U.S. PATENT DOCUMENTS

| | | | |
|---|---|---|---|
| 5,946,625 A | 8/1999 | Hassan et al. | |
| 6,684,076 B2 * | 1/2004 | McKenna et al. | 455/449 |
| 7,269,657 B1 * | 9/2007 | Alexander et al. | 709/229 |
| 8,064,375 B2 * | 11/2011 | Huschke | 370/312 |
| 2002/0193118 A1 * | 12/2002 | Jain et al. | 455/453 |
| 2005/0136943 A1 * | 6/2005 | Banerjee et al. | 455/456.1 |
| 2005/0246711 A1 * | 11/2005 | Berstis et al. | 718/105 |
| 2005/0278550 A1 | 12/2005 | Mahone et al. | |
| 2006/0112170 A1 * | 5/2006 | Sirkin | 709/217 |
| 2006/0136671 A1 | 6/2006 | Balakrishnan et al. | |
| 2007/0191054 A1 | 8/2007 | Das et al. | |
| 2007/0202907 A1 * | 8/2007 | Shaffer et al. | 455/518 |
| 2007/0218880 A1 | 9/2007 | Felter et al. | |
| 2008/0056125 A1 * | 3/2008 | Kneckt et al. | 370/229 |
| 2008/0240215 A1 | 10/2008 | Nobukiyo et al. | |
| 2008/0268864 A1 * | 10/2008 | Andersson et al. | 455/453 |
| 2009/0275343 A1 * | 11/2009 | Monnes et al. | 455/453 |
| 2009/0323528 A1 | 12/2009 | Loiacono et al. | |
| 2010/0278042 A1 * | 11/2010 | Monnes et al. | 370/230 |

FOREIGN PATENT DOCUMENTS

| | | |
|---|---|---|
| GB | 2379359 | 3/2003 |
| JP | 2008092095 A | 4/2008 |
| WO | WO-2006091137 A1 | 8/2006 |

OTHER PUBLICATIONS

Information about Related Patents and Patent Applications, see section 6 of the accompanying Information Disclosure Statement Letter, which concerns Related Patents and Patent Applications.
Japanese Office Action dated Jun. 22, 2012; Application Serial No. 2011-507476 in the name of Harris Corporation.

* cited by examiner

*Primary Examiner* — Nizar Sivji
(74) *Attorney, Agent, or Firm* — Fox Rothschild, LLP; Robert J. Sacco

(57) ABSTRACT

A system and method for assigning communication cells to servers in a cellular communication system. The method includes determining an affinity between a communication cell and a plurality of servers and assigning the communication cell to one of the plurality of servers based on the determined affinity.

21 Claims, 6 Drawing Sheets

SYSTEM AND METHOD FOR ASSIGNING COMMUNICATION CELLS TO SERVERS IN A CELLULAR COMMUNICATION SYSTEM

CROSS REFERENCE TO RELATED APPLICATIONS

This application claims priority to and the benefit of the filing date of U.S. Provisional Application No. 61/050,100 entitled "System and Method for Managing Communications in a Cellular Communication System", filed on May 2, 2008 and which is hereby incorporated by reference in its entirety.

BACKGROUND OF THE INVENTION

The subject matter disclosed herein relates generally to cellular communication systems, and more particularly, to a system for assigning communication cells to servers within a cellular communication system.

Cellular communication systems are used to provide voice and data communications between one or more communication units within the cellular communication system. The cellular communication units, for example, cellular telephones, mobile radios or other cellular devices allow communication between one or more users. A communication link may be established between two mobile cellular phone users allowing voice communications over the established communication link. The communication link may be provided using the Global System for Mobile Communications (GSM) standard that allows communication between different mobile telephones or radios.

Cellular data systems are also known that provide packet data communication capabilities that allow communication of voice and data. For example, the General Packet Radio Service (GPRS) standard may be used to communicate voice or other data in packets over a data channel. The voice and data may be communicated over a shared data channel. As another example, the Enhanced Data Rates for GSM Evolution (EDGE) standard may be used to provide higher speed data transmissions for particular applications.

In these different cellular communication systems, individual users may be able to communicate with a plurality of other users via a group call or other group connection. For example, in the Open Mobile Alliance (OMA) standard, users with mobile devices may communicate using a push-to-talk function, referred to as a push-to-talk over cellular (POC) function that allows users to communicate with different groups within a cellular communication system. Users may establish personal group lists or "buddy" lists on a cellular telephone and upon depressing a single button a user is able to establish a connection and communicate with or broadcast a message to multiple users. The multiple users may have been alerted to a request to join the connection.

The communications between devices corresponding to the personal group lists or "buddy" lists typically include small numbers of users or subscribers and the voice or data that is communicated is typically not time critical. If the particular cellular communication coverage area or communication cell in which a group communication is occurring becomes overloaded such that the capacity is exceeded (e.g., bandwidth exceeded) and some of the participants in the group call are unable to connect to the communication link (or some are dropped), those members of the group will not be able to participate in the communications. Thus, some group members will not be able to listen to the message or obtain the data transmitted over the group connection. However, because this type of personal communication is often not time critical, there are minimal consequences or no serious consequences resulting from such loss of connection or inability to connect by some users or subscribers. In other types of communication such as emergency group calls, loss of connection or inability to connect to a call can have serious (sometimes life threatening) consequences.

A main voice server typically controls a plurality of local voice servers corresponding to a plurality of local access points. The main voice server assigns coverage areas or cells to the local voice servers to manage the wireless capacity. The local voice servers can become overloaded as new users enter a communication cell already having users communicating therein and assigned to the same local voice server. Accordingly, communication traffic between users can cause large amounts of traffic between servers, which can affect overall system performance. Thus, because users are not always in the same cell with other users with which the users are communicating, inter-server communications can overload the system. Moreover, the local voice servers are unaware of the network topology, namely where the cells are located, thereby making it even more difficult to minimize inter-server traffic.

BRIEF DESCRIPTION OF THE INVENTION

In accordance with an exemplary embodiment of the invention, a method for assigning communication cells to servers in a communication network is provided. The method includes determining an affinity between a communication cell and a plurality of servers and assigning the communication cell to one of the plurality of servers based on the determined affinity.

In accordance with another exemplary embodiment of the invention, a method for assigning communication cells to voice traffic servers in a communication network is provided. The method includes determining an affinity between a plurality of communication cells and a plurality of voice traffic servers in the communication network and determining capacity objects for the plurality of communication cells based on the determined affinity with each of the plurality of voice traffic servers. The method further includes assigning communication cells to voice traffic servers based on the determined capacity objects.

In accordance with yet another exemplary embodiment of the invention, a wireless communication system is provided that includes a plurality of communication cells and a plurality of voice servers. The wireless communication system further includes an assignment server configured to assign communication cells of the plurality of communication cells to at least one of the plurality of voice servers based on a determined affinity of the communication cells to the plurality of voice servers.

DETAILED DESCRIPTION OF THE INVENTION

Figure 1:
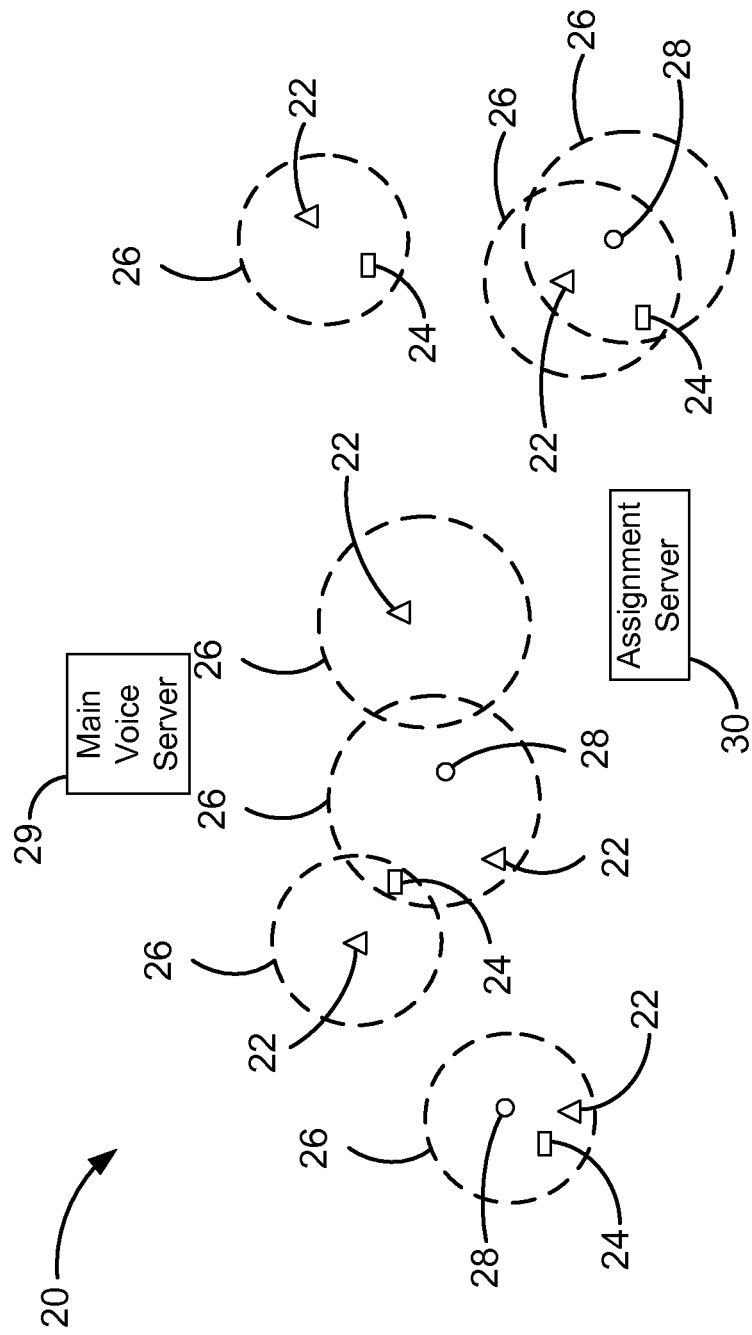
FIG. 1 is a block diagram of a cellular communication system in which communication cells are assigned to servers in accordance with various embodiments of the invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between system components or hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of the present invention provide for managing the assignment of communication cells and/or users therein to different voice servers within a communication system or vice versa. For example, management of the assignment of users and communication cells to voice servers, for example, cellular communication cells, within a cellular communication system 20 as shown in FIG. 1 may be provided. The cellular communication system 20 includes a plurality of cellular data network base stations, such as access points (APs) 22, which can comprise cellular network base stations. The cellular communication system 20 also includes a plurality of voice servers, illustrated voice traffic servers 24 associated with the APs 22. It should be noted that the voice traffic servers 24 are controlled by a main voice server 29, such as a Voice Network Interface Controller (VNIC). Also, the voice traffic servers 24 are shown to indicate that the voice traffic servers 24 may be associated at different times with zero or one or more different cells and in one embodiment the voice traffic servers 24 are physically located a central data center (not shown). Each of the plurality of APs 22 has a corresponding cellular data network communication coverage area 26 (also referred to as a communication cell or cell). The cellular data network communication coverage areas 26 may be overlapping at some locations.

As described in more detail herein one or more communication units, for example, user equipment (UE) 28 or other portable communication device can communicate with other UEs 28 using broadcast or group messaging. For example, the UEs 28 may be land mobile radios configured to communicate over the cellular communication system 20 by transmitting and receiving cellular data communication packets using voice over cellular (VOC). An assignment server 30, for example, an LMR access point assignment server, is provided that assigns communication cells (and users therein) to a particular voice traffic server 24 or vice versa. Accordingly, when reference is made herein to assigning communication cells to servers, this also refers to servers being assigned to communication cells.

Communication coverage areas 26 having UEs 28 therein are assigned to voice traffic servers 24. As the UEs 28 move between different network communication coverage areas 26, namely between different cells, the communication load (e.g., voice and data traffic load) among the voice traffic servers 24 can be balanced in an effort to maintain continuous and efficient communications. The assignment of a communication cell to a voice traffic server 24 may occur when a first UE 28 enters a communication cell or when a determination is made that communications between APs 22 or at the current AP 22 is becoming or has become congested or overloaded.

In accordance with the present invention, an affinity between users in a communication cell (defining a communication coverage area 26) and a plurality of voice traffic servers 24 may be determined and used to assign at least one communication cell to one of the voice traffic servers 24.

Assigning communication cells (and thus users) to a voice traffic server 24 based on an affinity, is a server assignment based on a commonality between users in a communication cell with other users on one or more voice traffic servers 24. In other words, the affinity defines a relationship that attempts to reduce or minimize the communication between APs 22. In accordance with the present invention, a heuristic is used that predicts the likelihood that two or more users will be communicating using the same communication group. The determination of an affinity may be based on one or more factors. For example, the affinity may be a geographic affinity based on a geographic location of users and/or a group affinity based on group memberships (e.g., talkgroup memberships) of the users.

Assignment of communication cells (and users therein) based on affinity may include using one or more different types of affinities. For example, assignment of a communication cell may be based on only a geographic affinity, only a group affinity or a combination of geographic affinity and group affinity. When using a combined affinity, each individual affinity may be separately weighted such that the geographic affinity value is provided one weighting factor that is different from the weighting factor for the group affinity value.

Geographic affinity uses geographic proximity of users to group users and assigns cells (and users therein) to voice traffic servers 24. For example, location areas (or LACs) are a grouping of one or more adjacent cells and in some embodiments are the size of a small city. The UE 28 can detect, using known methods, which LAC the UE 28 is in, and can report the LAC location information in mobility messages along with a cell ID to the assignment server. It should be noted that the LACs may be configured by GSM operators to group cells in the GSM network to minimize the size of paging areas (less towers to use) while minimizing the frequency that UEs 28 (e.g., LMR radios or cellular telephones) need to report a change in LAC. A general assumption is that often, users in the same group call (e.g., talking and listening in the same talkgroup call) will be mostly in the same LAC. Thus, geographic affinity may use the geographic proximity of users to one another to assign the users (in a communication cell) to a particular voice traffic server 24.

Group affinity uses a measure of the demand for groups that cells and voice traffic servers 24 have in common. For example, the affinity of a voice traffic server 24 to a cell may be defined as the number of groups that the cell has in common with the remaining cells (e.g., in an area or on the voice traffic server 24) divided by the number of groups in the cell. Groups in some embodiments refers to groups for which demand (e.g., a user has registered a desire to hear communication activity on the group) has been expressed. Generally, group affinity is determined based on the call groups that users have in common.

It should be noted that the various embodiments of the invention are not limited to assigning communication cells to servers in a cellular communication system. The various embodiments may be implemented in connection with different communication networks or systems wherein current bandwidth usage is not available and an estimation of the usage is desired or needed. For example, server assignment may be performed in a WiFi communication system. Also, the various embodiments may be implemented in connection with different cellular networks, such as an Enhanced Data Rates for GSM Evolution (EDGE) network or a W-CDMA (Wideband Code Division Multiple Access) network.

A determination is made as to how to assign communication cells to different voice servers in order to minimize inter-server traffic. For example, coverage areas may be assigned to different voice traffic servers 24 and re-assigned to other voice traffic server(s) 24 as a voice traffic server 24 becomes overloaded. Based upon this reassignment of coverage areas, inter-server traffic is continuously optimized.

Figure 2:
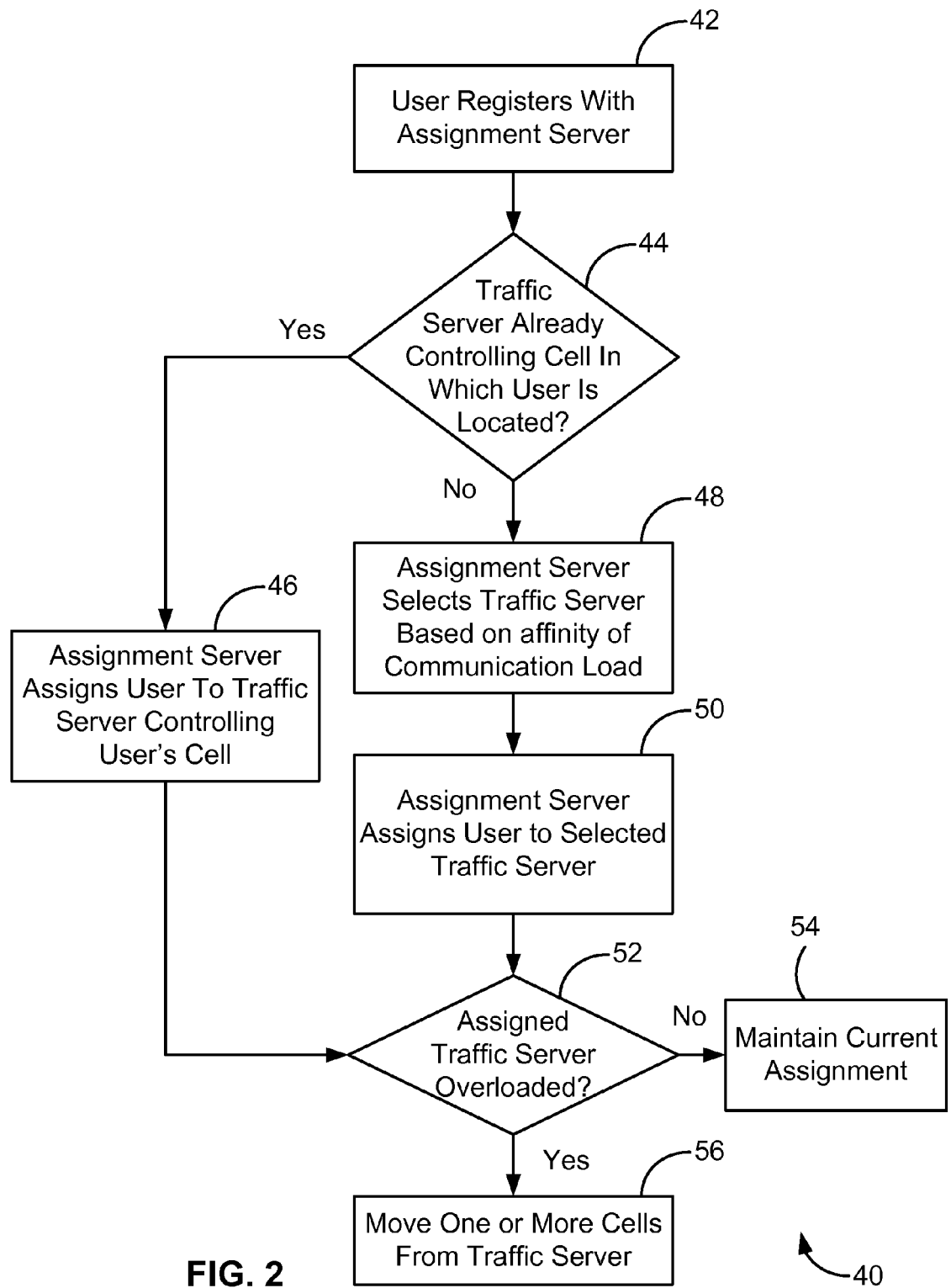
FIG. 2 is a flowchart of a method for assigning communication cells to servers in accordance with various embodiments of the invention.

In particular, a method 40 as shown in FIG. 2 is provided to assign communication cells (and users) to servers to maximize voice call legs within the server's assigned cells. The method 40 includes a user (e.g., UE) registering with an assignment server at 42 that will thereafter assign the user or communication cell to a voice traffic server (e.g., voice traffic server). For example, the method 40 begins a server assignment process when a user registers with an empty communication cell that has no other users therein. The registration of the user with the assignment server may be performed using any known assignment server registration process. Thereafter, the assignment server determines at 44 whether a voice traffic server already controlling traffic flow in (e.g., associated with) the communication cell in which the user is located or a LAC with which the communication cell is associated. If a voice traffic server is already controlling the communication cell or LAC in which the user is located, the assignment server assigns the user to that voice traffic server at 46. In some embodiments, the assignment includes finding a voice traffic server already servicing or controlling communications in a cell within the same area, for example, the same LAC if the LAC is in the process of moving to a new voice traffic server. Otherwise, the communication cell is assigned to the most loaded voice traffic server that is utilized below a predetermined threshold (e.g., 60% utilized). If no voice traffic servers are identified, then an alarm condition may be provided and the communication cell is assigned to the least loaded voice traffic server. It should be noted that the communication cell may be assigned based on other criteria, for example, the least loaded voice traffic server instead of the most loaded voice traffic server.

If no voice traffic server is controlling the communication cell in which the user is located, then at 48 the assignment server selects a voice traffic server to which the communication cell in which the user is located will be assigned. The assignment server selects the traffic server based on one of (i) an affinity (geographic and/or group) or (ii) a communication load of the traffic server. For example, if the assignment server selects the voice traffic server based on an affinity, one of a geographic affinity approach (or a group affinity approach as described in more detail below) may be used. Thereafter the assignment server assigns the communication cell to the selected voice traffic server at 50. A determination may then be made at 52 as to whether the voice traffic server is overloaded or later becomes overloaded, for example, the communication traffic volume exceeds a predetermined threshold. If the voice traffic server is not or does not become overloaded then the current assignment is maintained at 54. However, if the assigned voice traffic server is overloaded or becomes overloaded, one or more communication cells, such as communication cells within a LAC are moved from the voice traffic server at 56 and reassigned to another voice traffic server.

Cell Assignment Based on Geographic Affinity

Figure 3:
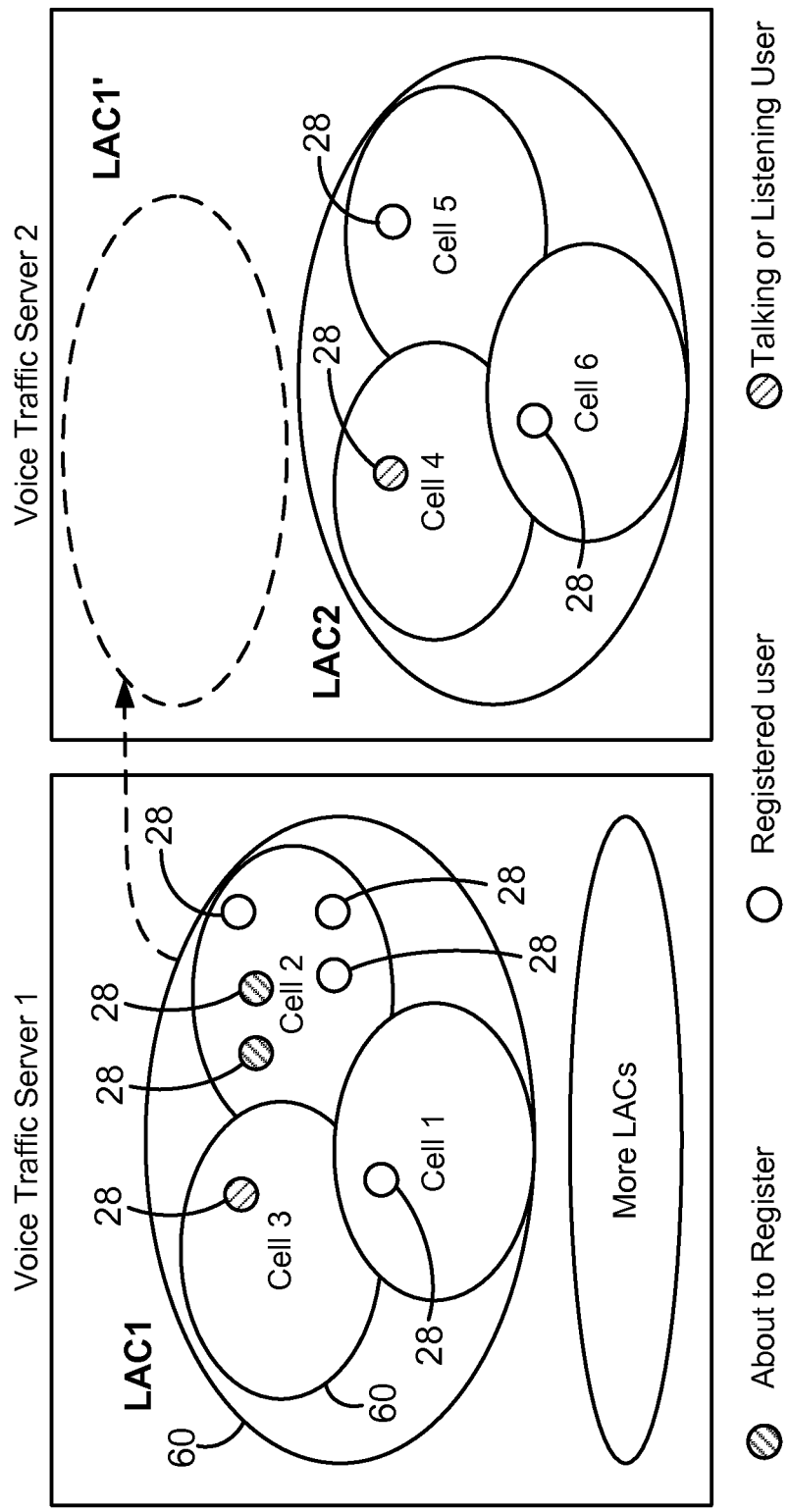
FIG. 3 is a diagram illustrating server assignment based on geographic affinity in accordance with various embodiments of the invention.

As indicated above, cell assignment may be based on geographic affinity. As an example of selecting a voice traffic server based on geographic affinity, the users are grouped geographically close to one another based on an assumption that these users are more likely to communicate with one another than with more geographically remote users. By employing geographic affinity, users in the same area (e.g., LAC) are kept on the same traffic server. For example, as shown in FIG. 3 which illustrates voice traffic server assignment based on geographic affinity, when a cell has no registered users, the cell can be assigned to a new voice traffic server 24. Accordingly, when a user (e.g., a UE 28) registers in a previously empty cell 60, the user is assigned to voice traffic server 2 and thus, the entire LAC 62 migrates and is reassigned to voice traffic server 2 such that the users in the same geographic proximity, namely in the same LAC 62, now have communications controlled by voice traffic server 2. The user are moved or reassigned to another voice traffic server 24 if a determination is made that the entire capacity object (defined here as a LAC) needs to be moved, for example, because of overloading.

A capacity object is a unit of measure (e.g., geographic measure or group membership measure) that is used to assign or reassign communication cells (and thus users) to a voice traffic server 24. For example, a capacity object may be defined as the smallest geographic unit of measure that is to be moved from one voice traffic server 24 to another voice traffic server 24, such as a communication cell. Additionally, in the various embodiments, a capacity object may be defined by a single communication cell or a plurality or groups of communication cells. Capacity objects, however, may be related based on, for example, a group affinity, such as group membership, or a geographic affinity, such as geographic or physical location of a user.

Figure 4:
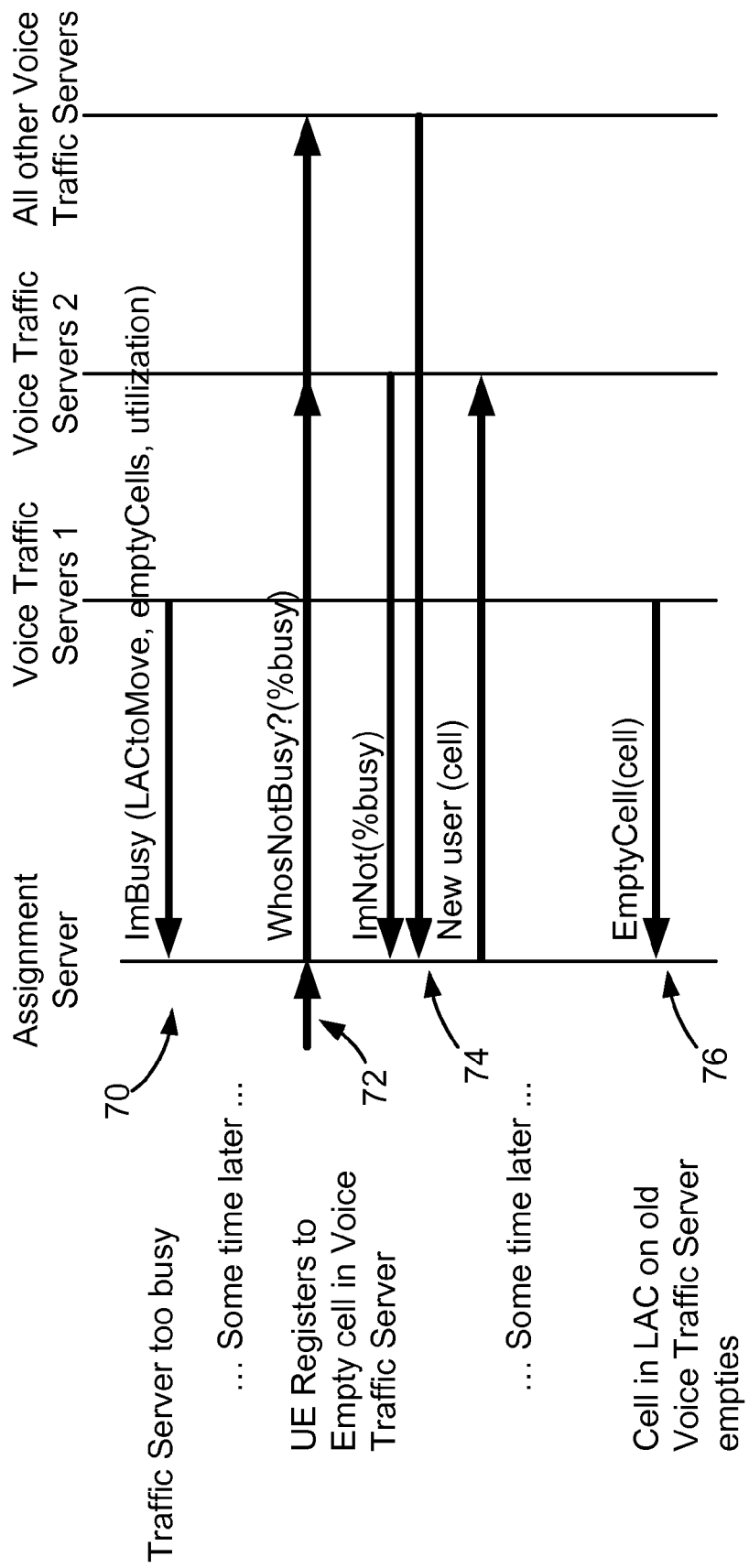
FIG. 4 diagram illustrating reassignment of communication cells to servers based on geographic affinity in accordance with various embodiments of the invention.

If the voice traffic server 24, for example voice traffic server 2, becomes overloaded or too busy, a determination is made as to which users, for example, which LAC in which the users are located to move. The LAC with the most users, but the least calls is then moved. Optionally, a determination is made as to which LAC has the fewest number of call legs (e.g., call connections or links) going to other cells using the voice traffic server and that LAC is moved (e.g., reassigned). This determination may be based on the total group membership of all calls as described in more detail below. It should be noted that when reference is made herein to moving a LAC, this refers to assigning all the users in all the communication cells within the LAC to another voice traffic server. Thus, as shown in FIG. 4, illustrating communication flows, at 70 a determination is made that a voice traffic server is overloaded, for example, voice traffic server 1. Thereafter, a user (UE)

registers with an empty cell at 72 and a determination is made to a voice traffic server that is not busy, for example, by assessing the communication or bandwidth levels of various voice traffic server. The new user and corresponding empty cell is assigned to a non-busy voice traffic server, for example, voice traffic server 2 at 74 and thereafter the cell in the LAC on the old voice traffic server, namely voice traffic server 1 is emptied at 76, such that no users are in that cell.

A geographic affinity assignment process may be provided based on a capacity object. For example, an assignment ($\alpha$=Asn(c)) for a given LAC capacity object c (defined here as a cell) to a voice traffic server $\alpha$ is provided as follows:

1. Sort the voice traffic server by a number of users.
2. Take $\alpha$=the first voice traffic server in sorted the list.
3. Then repeat the following steps until the assignment fails or is successful.
    a. If $\alpha$ is reporting overload, skip to the next voice traffic server.
    b. If $\alpha$ has capacity for the number of mobiles in c, (i.e. $u_a+u_c<T_u$, where $T_u$ is the threshold for number of users to assign to a voice traffic server, $u_a$ is the number of users registered on a voice traffic server and $u_c$ is the number of users registered on a cell c), assign the object to the voice traffic server $\alpha$. The assignment is successful and $T_u$ should be low enough to allow capacity for individual users to register in communication cells assigned to the voice traffic server.
    c. Otherwise, if there are additional voice traffic servers in the list, set $\alpha$=the next voice traffic server in the list that has capacity.
    d. Otherwise, the assignment fails, set $\alpha=\emptyset$.

It should be noted that the method described above may select a voice traffic server with more user burden based on the premise that a capacity object will have more chance of later affinity if there is a larger set of users assigned to the voice traffic server.

Cell Assignment Based on Group Affinity

Cell assignment may be based on group affinity. For example, a cell can be assigned to a traffic server with the highest group affinity. Group affinity is defined as the cell having users with the most call groups in common (the AP and communication cell). As described above, the group affinity may be determined based on the following: (# of groups in cell served by the traffic server)/(# of groups in the cell).

More particularly, the group affinity equation described above is determined as follows. In various embodiments, the group membership of a cell c is defined as:

$$G_c=\{\text{groups } g\text{:there is demand for } g \text{ on the given cell } c\} \quad \text{Eq. 1}$$

The affinity ($A_{ca}$) of a voice traffic server to an object with group membership $G_c$ is then defined as the sum total of the number of groups for which there is demand (e.g., a user has registered a desire to hear communication activity on the group) on a cell that are also forwarding voice calls to other cells also assigned to the access point, divided by the total number of groups for which there are demanded. The group affinity $A_{ca}$ may be expressed mathematically as follows:

$$A_{ca} \equiv \frac{\eta\left(G_c \cap \left(\bigcup_{r \in a, r \neq c} G_r\right)\right)}{\eta(G_c)} \quad \text{Eq. 2}$$

Wherein $A_{ca}$ is the affinity of a cell "c" to an access point "a", $\eta$ is the "number of", $G_c$ is the groups in a cell, $G_r$ is the groups in all the other cells (not cell c) connected to the AP 22 that have registered a demand, $\cap$ represents an intersection function and U represents a union function. Thus, the group affinity of a cell c to an AP 22 is determined based on the groups to which user in the cell c are members and have registered demand compared with (i.e., the intersection of) the sum total ($\eta$) of all groups serviced by a voice traffic server and have registered demand that are in cells other than c. The sum total ($\eta$) of this intersection is divided by the sum total of all groups for all users within the cell. Accordingly, the affinity is determined by the number of (Groups that are both in cell c and some other cell on the AP) divided by the number of groups in cell c.

Accordingly, when performing voice traffic server assignment based on group affinity when a cell has no registered users, the cell can be assigned to a non-busy voice traffic server 24 having the highest group affinity. The determination of a non-busy voice traffic server 24 may be based on a predetermined threshold for the number of users, number of calls/legs, or current utilization level of the traffic server. For example, a determination is made as to whether the voice traffic server 24 is maintaining connections for less than 50 users or is less than 40% utilized. When a voice traffic server 24 becomes busy, and exceeds the predetermined threshold, the communication cells may be moved by reassigning traffic servers to some communication cells. For example, communication cells with the least affinity for the voice traffic server 24 may be moved to a non-busy voice traffic server 24 with the highest affinity. However, other factors or criteria may be used when determining whether to move cells, such as not moving cells with active calls or determining certain stored demand values.

Thus, a group affinity assignment process may be provided based on an assignment ($\alpha$=Asn(c)) for a given cell c to a voice traffic server $\alpha$, as follows:

1. For every voice traffic server $\alpha$, the group affinity $A_{ca}$ of the cell c for the voice traffic server $\alpha$ is computed as described above.
2. The results are sorted by decreasing affinity ($A_{ca}$) and decreasing user burden ($u_a$=registered users in voice traffic server $\alpha$) such that:

$$\forall_{a<b}[(A_{ca}>A_{cb})\|((A_{ca}=A_{cb})\&(u_a \geq u_b))]$$

3. Then, set $\alpha$=the first voice traffic server in the list.
4. Thereafter the following steps are repeated until the assignment fails or is successful:
    a. If $\alpha$ has capacity for the number of users in c, (i.e. $u_a+u_c<T_u$, where $T_u$ is the threshold for the number of users to assign to a voice traffic server), the object is assigned to the voice traffic server $\alpha$. The assignment is successful and $T_u$ should be low enough to allow capacity for individual users to register in communication cells assigned to the voice traffic server.
    b. Otherwise, if there are additional APs in the list, set $\alpha$=the next voice traffic server in the list that has capacity.
    c. Otherwise, the assignment fails, set $\alpha=\emptyset$.

It should be noted that if two voice traffic servers have the same affinity, the process described above assigns a higher rank to the voice traffic server with more user burden based on the assumption that a cell has more chance of later affinity if there is a larger set of users assigned to the voice traffic server.

Figure 5:
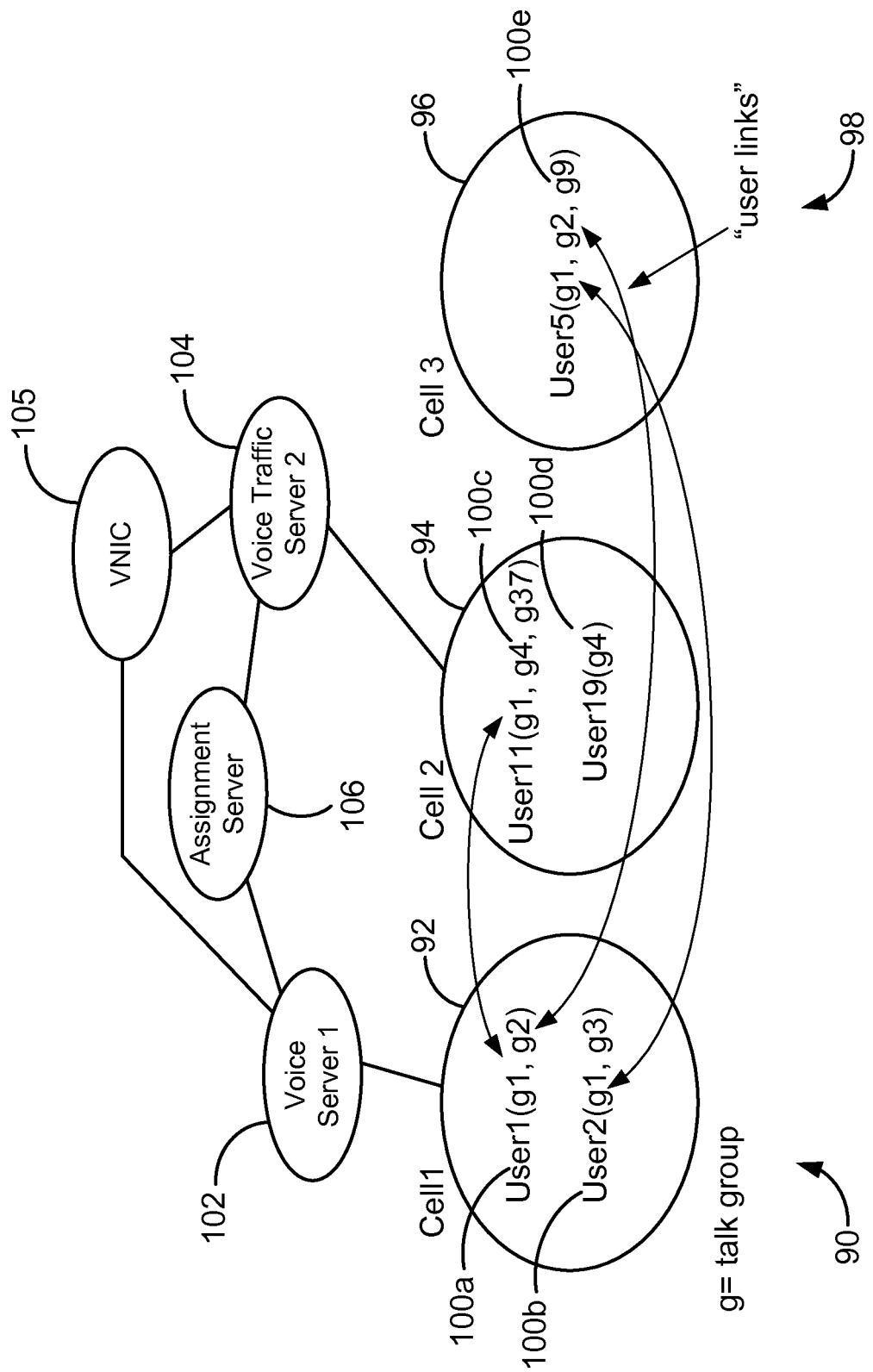
FIG. 5 is a schematic block diagram illustrating communication cell reassignment in accordance with various embodiments of the invention.

Thus, in accordance with various embodiments of the invention and as shown in FIG. 5, an assignment scheme 90 using group affinity may be provided, which is illustrated in connection with a plurality of cells 92, 94 and 96 within a communication system, a portion of which is identified as 98.

Within each cell 92, 94 and 96 are one or more users 100a-100e, each of which is a member of or communicates with a particular group or groups as indicated in parenthesis after the user name in FIG. 5. Because the system is not programmed with the specifics of the particular network topology, for example, where the communication cells 92, 94 and 96 are located, communication cells are assigned to voice servers 102 and 104 (which may be voice traffic server connected to a main voice server 105). In particular, each UE, which may correspond to each of the users 100a-100e, registers with an assignment server 106 that then assigns communication of the users within a particular communication cell 92, 94 or 96 to a particular voice server 102 or 104 having the communication cell 92, 94 or 96 assigned thereto. In particular, the assignment server 106 assigns the UE corresponding to users 100a-100e to a voice server 102 or 104 serving the communication cell 92, 94 or 96 in which the UE is connected. For example, users within communication cell 92 are assigned to voice server 102 and users within communication cell 94 are assigned to voice server 104 based on a determined affinity (geographic or group), for example, by the talk groups to which the users 100a-100e are a member. Thus, communication cell 96 is reassigned to voice server 102 because the communication cell 96, and more particularly, the users in the communication cell 96 have a group affinity, via groups 1 and 2, with communication cell 92.

It should be noted that if a communication cell is not assigned to a voice server, for example, communication cell 96, the communication cell 96 will be assigned to a voice server such that the anticipated connections to the other voice servers 102 or 104 are minimized. Moreover, it should be noted that as voice servers 102 and 104 become over-loaded, communication cells with the most connections external to the server are reassigned to a voice server such that predicted traffic between voice servers is minimized. Accordingly, traffic within a particular voice server, for example, voice server 102 or voice server 104 is increased or maximized and traffic between the voice servers 102 and 104 is reduced or minimized.

In particular, if users are to be assigned to a particular communication cell, the system determines to what groups the particular user 100a-100e is a member. For example, as shown in FIG. 5, user 100e is a member of groups g1, g2 and g9. Accordingly, because user 100a is a member of group g1 and user 100b is a member of g1 and user 100a is a member of group g2, which are two out of the three groups for which user 100e is a member, the user links for communication on groups 1 and 2 are assigned to the voice server 102 such that communication cells 92 and 96 are assigned to voice server 102. It should be noted that because user 100a and 100c only have one group in common, communication cell 94 is not reassigned to voice server 102, but remains assigned to voice server 104. Capacity objects may be assigned that are related to the voice servers as described above. It should also be noted that if there are no matching user groups between users within the communication cells, the system attempts to locate a communication cell that has less traffic communications. Moreover, if a particular user 100a-100e has a determined less group affinity with the other users within the particular communication cell, for example, communication cell 92 or 94, then the user is removed from the communication cell and reassigned to another communication cell and communicates with a different voice server. Thus, the number of connections may be counted and scored from communication cell 92 to communication cell 96. The physical closeness of the communication cells (namely the geographic affinity as described above) and the number of active links also may be determined. Based upon one or more of these determinations, activity between communication cells and voice servers is assigned or reassigned. Accordingly, the various embodiments generally attempt to assign capacity objects to a voice traffic server 24 having other capacity objects assigned thereto with a high level of affinity.

Figure 6:
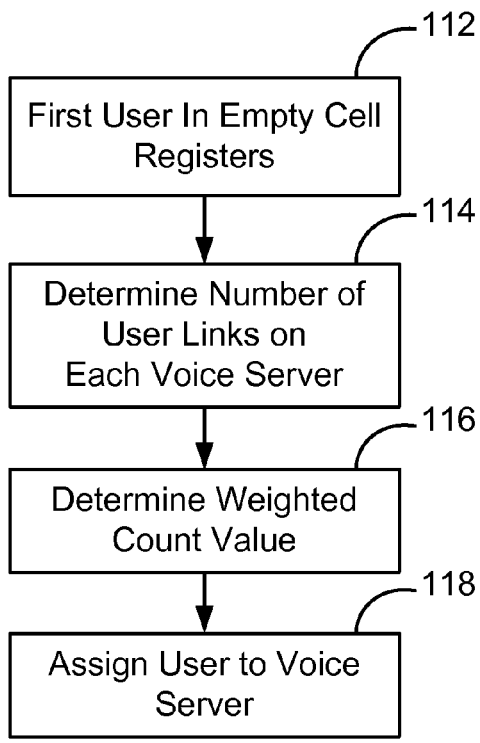
FIG. 6 is a flowchart of a method for an initial voice server selection in accordance with various embodiments of the invention.

A method 110 for initial voice server selection based on affinity is shown in FIG. 6. The method 110 includes a user within an empty communication cell registering within an assignment server at 112. Thereafter, at 114 the assignment server determines, for example, tallies, the other users in the new user's "buddy" list or other group members on each of a plurality of different voice servers. For example, these other group members may be defined by user links. Thereafter, at 116 a weighted count value is determined for each of the voice servers relative to the new user. Also, historical data if available, for example, how often the user has a call leg to the group member, may give weight to each tally count. Further, inter-cell proximity may also give weight to the count. The weighting may be varied based upon different circumstances or the particular desired communications within that particular communication system. Based upon this weighting a weight count value is determined for each of the voice servers for the particular user. The assignment server then selects the voice server with the highest count value, for example, the highest weighted count value, which may also be based on a weighting of a geographic affinity, and assigns the new user and communication cell to that particular voice server. Thus, based on the number of links and a weighting of the counts for each link (e.g., each link may have a value of 1 or some multiple, such as 1.2, 1.5, 2.0 etc.), a determination is made as to which voice server to assign the new user and communication cell. However, it should be noted that in some embodiments assignments are not made to a particular voice server if that voice server has exceed a threshold number of users or a threshold congestion level.

Figure 7:
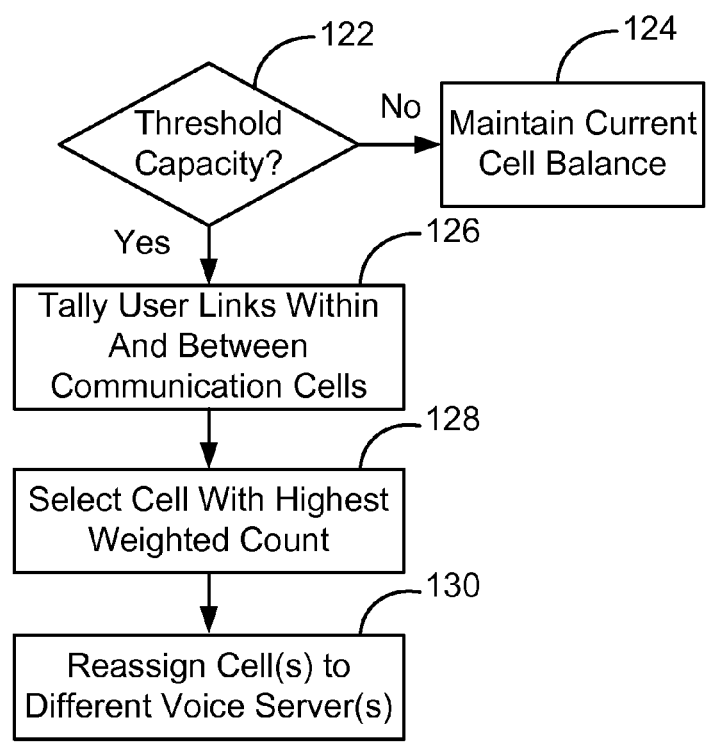
FIG. 7 is a flowchart of a method for voice server balancing in accordance with various embodiments of the invention.

A method 120 for voice server balancing is shown in FIG. 7. Specifically, a determination is made at 122 as to whether a voice server has reached or exceeded a configurable threshold of capacity, for example, too many call legs, users, internal resource usage, etc. If the threshold capacity has not been reached, then the current voice server balance is maintained at 124. However, if the threshold capacity has been reached or exceeded as determined at 122, then at 126 the assignment server tallies user links within and between communication cells. For example, as is shown in FIG. 5, a determination is made as to links with other users in the same or different communication cells based upon a particular talk group to which the users are members. Historical data, if available, may be used including, for example, how often a user has a call leg to the group or buddy, which gives additional weight to each tally count. Further, the links that have had a recent call also may be given more weight. Additionally, inter-cell proximity also may give weight to the counts (geographic affinity). Once all the user links have been determined and the counts made and weighted, the assignment server then selects at 128 a cell with the highest count based upon the weighted count for the user links. Thereafter, one or more cells are reassigned to another voice server based upon the weighted count value determined at 128. Thus, the method 120 locates and reassigns communication cells that have a higher affinity for a particular voice traffic server.

It also should be noted that the assignment server may check the voice servers to determine those with lower utilization, such as less call legs, etc. For each unattached communication cell, for example, the communication cell 96 (shown in FIG. 5) the assignment server may tally the user links to each underutilized voice server with similar weighting given to factors as described herein. The assignment server then obtains a score for each pairing, and in particular each pairing of one communication cell to another communication cell, for example, user links between communication cell 96 and communication cell 92 and user links between communication cell 96 and communication cell 94. Thereafter, based upon the score for each pairing, the communication cell 96 is reassigned to a voice server with the best or highest score, for example, one of voice server 102 and voice server 104. It should be noted that periodic rebalancing in some embodiments is performed during off-peak times.

In accordance with various embodiments of the invention, a hierarchy structure provided for managing communications, for example, cellular data connections in a cellular communication network or system. The various embodiments provide different means for controlling the communications, such as, voice over communications within the cellular communications system. The various embodiments may estimate current congestion and/or use historical data to determine whether a particular cell is going to reach a particular maximum level and based upon that determination, adjust factors and take actions within the cell to ensure that group calls are maintained, in particular, by performing cell reassignments to different voice servers. The determination of a congestion level may be made as described in co-pending and commonly owned patent application entitled "System and Method for Managing Communications in Cells Within a Cellular Communication System" having patent application Ser. No. 12/431,530, the entire disclosure of which is hereby incorporated by reference herein.

The various embodiments or components, for example, the cellular communication system or controllers therein, may be implemented as part of one or more computer systems. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for assigning communication cells to voice traffic servers in a communication network, the method comprising:

evaluating a plurality of defined factors associated with a plurality of users, including their associated communication devices, in said communication network to determine one or more points of commonality which exist among identified first users of said plurality of users in a communication cell and identified second users of said plurality of users on at least one voice traffic server and which signify a probability that said identified first and second users will be communicating with each other;

based on said points of commonality, existing among said first and second users, determining a group affinity and a geographic affinity between users in the communication cell and each voice traffic server of a plurality of voice traffic servers; and dynamically assigning, based on said group affinity and said geographic affinity, a selected voice traffic server from among said plurality of voice traffic servers, to service a cellular data network base station associated with the communication cell.

2. A method in accordance with claim 1, wherein at least one of said group affinity and said geographic affinity is higher than an affinity of said users with respect to a remainder of said plurality of voice traffic servers.

3. A method in accordance with claim 1, wherein the assigning further comprises assigning the selected voice traffic server of the plurality of voice traffic server to service the cellular data network base station based on a communication traffic level of the selected voice traffic server.

4. A method in accordance with claim 3, wherein the communication traffic level is based on a number of users in a communication cell.

5. A method in accordance with claim 3, wherein the communication traffic level is based on a number of call legs in a communication cell.

6. A method in accordance with claim 1, wherein said selected voice traffic server services a plurality of communication cells, and further comprising reassigning one of the plurality of communication cells to another one of the plurality of voice traffic servers based on a communication traffic level of the plurality of voice traffic servers.

7. A method in accordance with claim 6, wherein the reassigning comprises determining one of said plurality of communication cells which services users having a lowest affinity with said selected voice traffic server and reassigning the communication cell with the lowest affinity.

8. A method in accordance with claim 6, wherein the reassigning comprises assigning the communication cell to a non-busy server of the plurality of voice traffic servers having a highest affinity with respect to said users within said communication cell being reassigned.

9. A method in accordance with claim 6, wherein the reassigning comprises assigning the communication cell to another one of the plurality of voice traffic servers if the communication cell has no active calls.

10. A method in accordance with claim 1, wherein the communication cell initially includes no registered users and wherein the assigning is performed upon a user registering within the communication cell.

11. A method in accordance with claim 1, wherein said points of commonality further comprise related user links and the assigning is based on the calculated number of related user links, wherein the user links comprise links between users within a same user group.

12. A method in accordance with claim 11, further comprising weighting the calculated number of user links, wherein the weighting is based on at least one of historical data, recent call information, group connection information and inter-cell proximity.

13. A method in accordance with claim 1, wherein the plurality of defined factors include a geographic location and a group registration.

14. A method for assigning communication cells to voice traffic servers in a communication network, the method comprising:

evaluating a plurality of defined factors associated with a plurality of users, including their associated communication devices, in said communication network to determine one or more points of commonality which exist among identified first users of said plurality of users in a communication cell and identified second users of said plurality of users on at least one voice traffic server and which signify a probability that said identified first and second users will be communicating with each other, said points of commonality comprising at least one of a geographic location and a group membership;

based on said one or more points of commonality, existing among said first and second users, determining an affinity between users in the communication cell and each voice traffic server of a plurality of voice traffic servers, said affinity determined using at least a measure of a demand for groups that said communication cells and said voice traffic servers have in common; and dynamically assigning, based on said affinity, a selected voice traffic server from among said plurality of voice traffic servers, to service a cellular data network base station associated with the communication cell;

wherein the affinity comprises a combination of a geographic affinity and a group affinity.

15. A method in accordance with claim 14, wherein the geographic affinity is based on a geographic proximity between each said first user and each said second user.

16. A method in accordance with claim 14, wherein the group affinity is based on one or more communication groups to which said users within the communication cell are members.

17. A method in accordance with claim 14, further comprising weighting each of a geographic affinity value and a group affinity value to determine a combined affinity.

18. A method for assigning communication cells to voice traffic servers in a communication network, the method comprising:

evaluating a plurality of defined factors associated with a plurality of users, including their associated communication devices, in said communication network to determine one or more points of commonality of which exist among identified first users of the plurality of users in a communication cell and identified second users of said plurality of users on at least one voice traffic server;

based on said evaluating, determining a geographic affinity and a group affinity between users in one or more of said communication cells and each of a plurality of voice traffic servers in the communication network, said geographic affinity determined using a geographic proximity between each said first user to each said second user and said group affinity determined using a measure of a demand for groups that said communication cells and said voice traffic servers have in common; and dynamically assigning a plurality of said communication cells to said voice traffic servers based on the determined geographic affinity and group affinity of said users in each of the one or more communication cells to each of the voice traffic servers.

19. A method for assigning communication cells to voice traffic servers in a communication network, the method comprising:

evaluating a plurality of group registrations for a plurality of user equipment operated by a plurality of users in one or more communication cells of said communication network to determine a group registration commonality which exists among said users;

based on said evaluating, determining a group affinity between users in one or more communication cells and a plurality of voice traffic servers in the communication network, said group affinity determined using a measure of demand for groups that said communication cells and said plurality of voice traffic servers have in common; and dynamically assigning communication cells to voice traffic servers based on the determined group affinity and a geographic affinity of the plurality of users in each of the one or more communication cells to each of the voice traffic servers.

20. A method in accordance with claim 19, wherein determining the group affinity further comprises determining a commonality of group registrations of user equipment of the plurality of users in different ones of the communication cells.

21. A wireless communication system comprising:
a plurality of communication cells;
a plurality of voice traffic servers; and
an assignment server configured to:
evaluate a plurality of defined factors associated with a plurality of users, including their associated communication devices, in said communication network to determine one or more points of commonality which exist among identified first users of said plurality of users in a communication cell and identified second users of said plurality of users on at least on voice traffic server, and which signify a probability that said identified first and second users will be communicating with each other;

based on said one or more points of commonality existing among the first and second users, determine a group affinity and a geographic affinity between said plurality of users in one of said communication cells and each of a plurality of voice traffic servers, said geographic affinity determined using at least one of a geographic proximity between each said first user to each said second user and said group affinity determined using a measure of a demand for groups that said communication cells and said voice traffic servers have in common; and dynamically assign, based on said group affinity and said geographic affinity, a selected voice traffic server from among said plurality of voice traffic servers, to service a cellular data network base station associated with said communication cell.

* * * * *